(12) United States Patent
Heinz et al.

(10) Patent No.: US 8,307,957 B2
(45) Date of Patent: Nov. 13, 2012

(54) DISK BRAKE WITH GUARD SCREEN

(75) Inventors: Stefan Heinz, Eppstein (DE); Christoph Sander, Erzhausen (DE); Uwe Bach, Niedernhausen (DE); Ralf Sundheim, Frankfurt am Main (DE); Roberto Stoka, Schwalbach (DE)

(73) Assignee: Continental Teves AG & Co. oHG (DE)

( * ) Notice: Subject to any disclaimer, the term of this patent is extended or adjusted under 35 U.S.C. 154(b) by 895 days.

(21) Appl. No.: 12/300,153

(22) PCT Filed: May 9, 2007

(86) PCT No.: PCT/EP2007/054474
§ 371 (c)(1),
(2), (4) Date: Feb. 2, 2009

(87) PCT Pub. No.: WO2007/131922
PCT Pub. Date: Nov. 22, 2007

(65) Prior Publication Data
US 2009/0152056 A1 Jun. 18, 2009

(30) Foreign Application Priority Data

May 12, 2006 (DE) .......................... 10 2006 022 699
May 31, 2006 (DE) .......................... 10 2006 025 304

(51) Int. Cl.
*F16D 55/228* (2006.01)
(52) U.S. Cl. ...................... 188/72.5; 188/71.1; 188/73.1

(58) Field of Classification Search ................. 188/72.5, 188/71.1, 73.1, 73.38, 73.39, 264 W
See application file for complete search history.

(56) References Cited

U.S. PATENT DOCUMENTS 6,971,486 B2 * 12/2005 Stickney et al. ........... 188/73.35
2005/0173205 A1 8/2005 Bach et al.

FOREIGN PATENT DOCUMENTS

| DE | 3925587 A1 * | 2/1991 |
| DE | 41 01 514 A1 | 7/1992 |
| DE | 4106957 A1 * | 9/1992 |
| DE | 100 27 783 A1 | 1/2002 |
| DE | 101 59 328 A1 | 9/2002 |
| DE | 10 2006 020 282 A1 | 10/2007 |
| EP | 1 146 245 A2 | 10/2001 |
| EP | 1 227 260 A2 | 7/2002 |

* cited by examiner

*Primary Examiner* — Pamela Rodriguez
(74) *Attorney, Agent, or Firm* — RatnerPrestia

(57) ABSTRACT

A disk brake for a vehicle having a bracket which is fixed with respect to the vehicle and on which brake linings and at least one brake caliper are mounted so as to be movable in an axial direction is disclosed. The bracket and the brake caliper engage around at least one brake disk, and the brake caliper includes a housing limb with at least one actuating device, a further housing limb with at least one housing finger, and a housing bridge. A spring arrangement which generates an elastic preload between the brake caliper and the bracket is provided in such a way that the preload is aligned substantially perpendicular to a movement direction of the brake caliper. The spring arrangement comprises a spring element and a protective panel.

14 Claims, 6 Drawing Sheets

DISK BRAKE WITH GUARD SCREEN

CROSS REFERENCE TO RELATED APPLICATIONS

This application is the U.S. national phase application of PCT International Application No. PCT/EP2007/054474, filed May 9, 2007, which claims priority to German Patent Application No.: DE102006022699.2, filed May 12, 2006 and German Patent Application No.: DE102006025304.3, filed May 31, 2006, the contents of such applications being incorporated by reference herein in their entirety.

BACKGROUND OF THE INVENTION

1. Field of the Invention

The invention relates to a disk brake having a protective panel, having a bracket which is fixed with respect to the vehicle and on which brake linings and at least one brake caliper are mounted so as to be movable in an axial direction, with the bracket and the brake caliper engaging around at least one brake disk, and with the brake caliper having a housing limb with at least one actuating device, a further housing limb with at least one housing finger, and a housing bridge, having a spring arrangement which generates an elastic preload between the brake caliper and the bracket, in such a way that the preload is aligned substantially perpendicular to a movement direction of the brake caliper, and with the spring arrangement comprising a spring element and a protective panel.

2. Background of the Invention

Disk brakes on vehicles are subjected to very high loading on account of their proximity to the road surface and as a result of numerous factors, and must therefore be of extremely robust design. Particularly loose objects on the road surface may cause sensitive impact marks on the individual components of the brake, such that under some circumstances, said components become damaged or non-functional. Furthermore, it is increasingly important for customers to known that they have a visually appealing and harmonized and compact brake installed on the vehicle. EP 1 227 260 A2 discloses a disk brake which has a spring arrangement with a spring element and a cover. Here, the spring element performs the primary function of fixing the sliding-caliper-side brake lining. The cover is connected to the spring element in such a way that said cover serves for the axial support of the spring arrangement on the brake caliper. This necessitates an awkward design of the cover.

SUMMARY OF THE INVENTION

It is an object of the invention to specify a disk brake which avoids the disadvantages of the prior art and which provides an improved alternative, in particular by means of expedient coverage of the components of the disk brake.

The object is achieved according to aspects of the invention by means of the invention described herein, in that the housing finger, the spring element and the protective panel are arranged axially with respect to one another in such a way that the spring element is positioned between the housing finger and the protective panel. The protective panel thus functions as a caliper panel and advantageously covers a significant part of the spring arrangement. Here, the disk brake is particularly well protected if the caliper panel covers a significant part of the brake caliper.

One advantageous development of the invention comprises that the spring arrangement is fixed to the brake caliper by means of a fastening device, since in this way, a spacing between the caliper panel and brake caliper is constant, and the components cannot collide with one another. As a result, wear of the brake linings does not lead to a movement of the protective panel.

In a further embodiment of the invention, the spring arrangement is fixed to the bracket by fastening means, wherein the spring element may be formed in multiple parts from a spring piece and a support element.

Alternatively, the spring element may be attached to the caliper panel in such a way that the force flow of the preload $F_v$ runs, in sections, through the caliper panel.

In order to protect the components of the disk brake in a particularly effective and complete manner, it is proposed that a bracket panel be provided which is fixedly connected to the bracket. The positive effect is particularly pronounced if the bracket panel serves, in interaction with the caliper panel, as a multi-part protective panel, and covers a significant part of the disk brake.

An alternative solution to the problem relates to a disk brake having a bracket, which is fixed with respect to the vehicle, and having a brake caliper, with at least two brake linings being mounted in the disk brake so as to be movable in an axial direction, and with the brake caliper engaging around at least one brake disk which can be acted on axially by the brake linings, and with the brake caliper having a housing limb with at least one actuating device and a housing bridge, and also comprising at least one protective panel. The object stated above is achieved here in an alternative manner by means of the features disclosed hereinafter in that the protective panel is provided on the disk brake in such a way that most of the brake disk is covered.

Here, the protective panel may expediently either serve as a caliper panel and be fixed to the brake caliper by means of a fastening device, or be embodied as a bracket panel and be fixed to the bracket by fastening means. Both variants have proven to be advantageous and serve for the protection and visual harmonization of the disk brake. It is also conceivable for the bracket panel and the caliper panel to function in combination as a protective panel.

In a further embodiment of the invention, the protective panel of the disk brake is produced from plastic. The use of plastic provides a high level of corrosion resistance and cost-effective production of the protective panel.

Furthermore, the spring element of the spring arrangement may be arranged at least partially in the material of the caliper panel, as a result of which that region of the spring element which is enclosed by plastic is stiffened. This may be implemented for example by means of a simple injection-molding process.

In order to exchange the caliper panel quickly and easily on the vehicle, and to renew the protection and appearance of the brake, the spring element and the caliper panel may be connected by means of a form-fitting and detachable mechanism.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
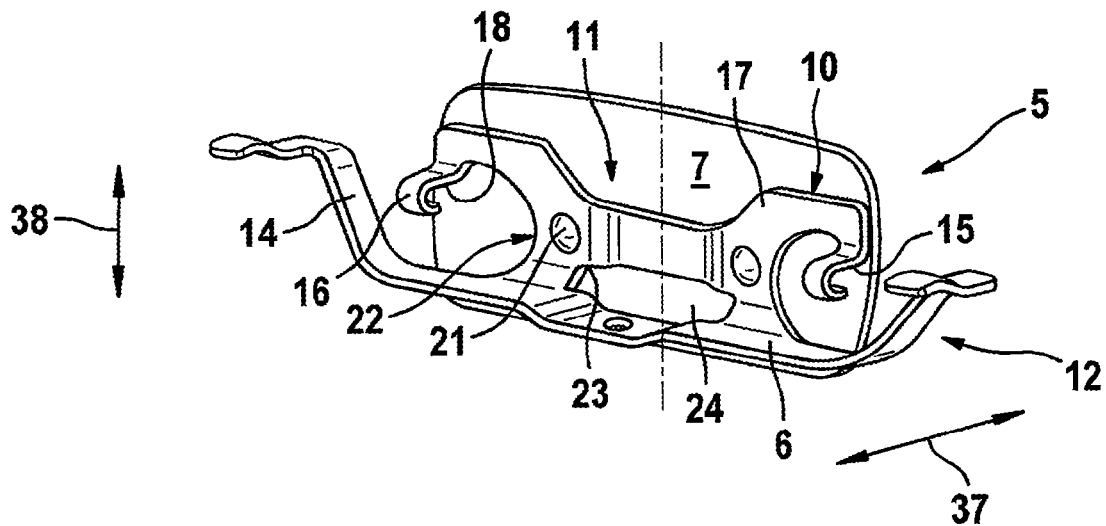
FIG. 1 shows a perspective view of the spring arrangement with a caliper panel for a disk brake.
Figure 2:
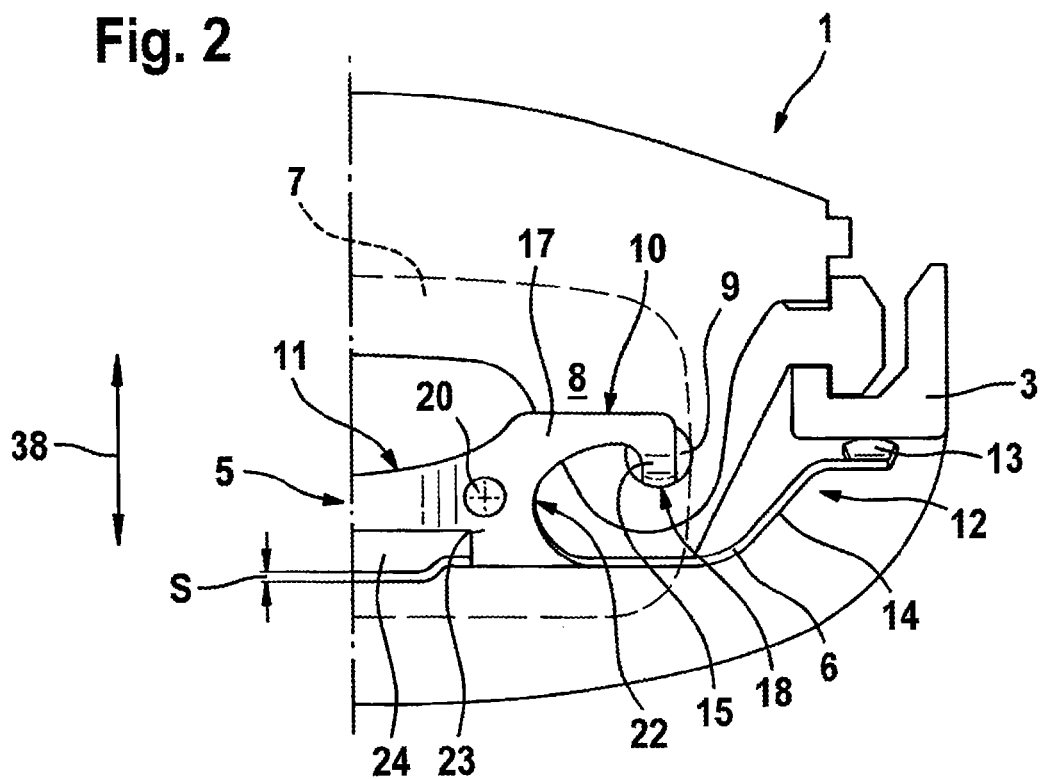
FIG. 2 shows a disk brake with a mounted spring arrangement as per FIG. 1.
Figure 3:
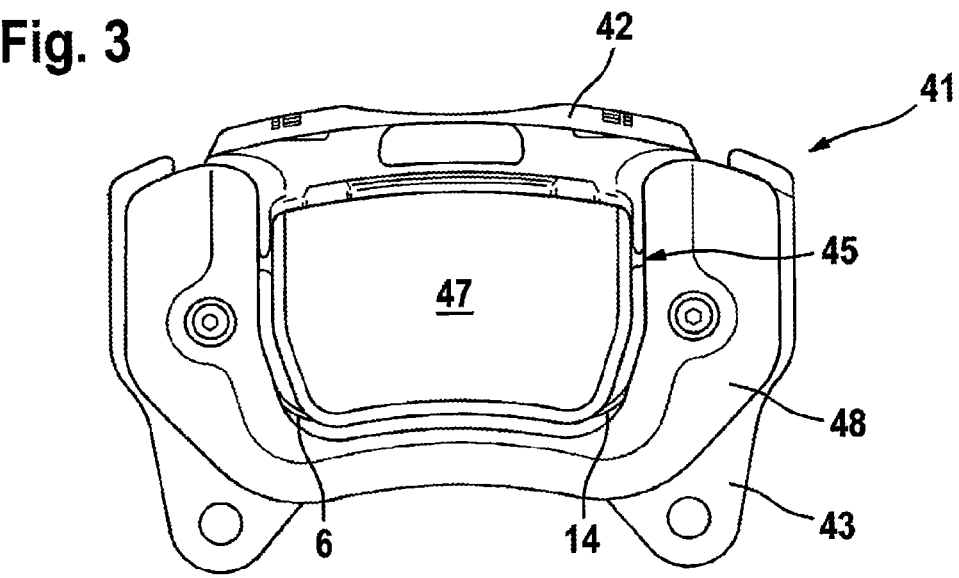
FIG. 3 shows a disk brake as per FIG. 2 with an additional bracket panel.
Figure 4:
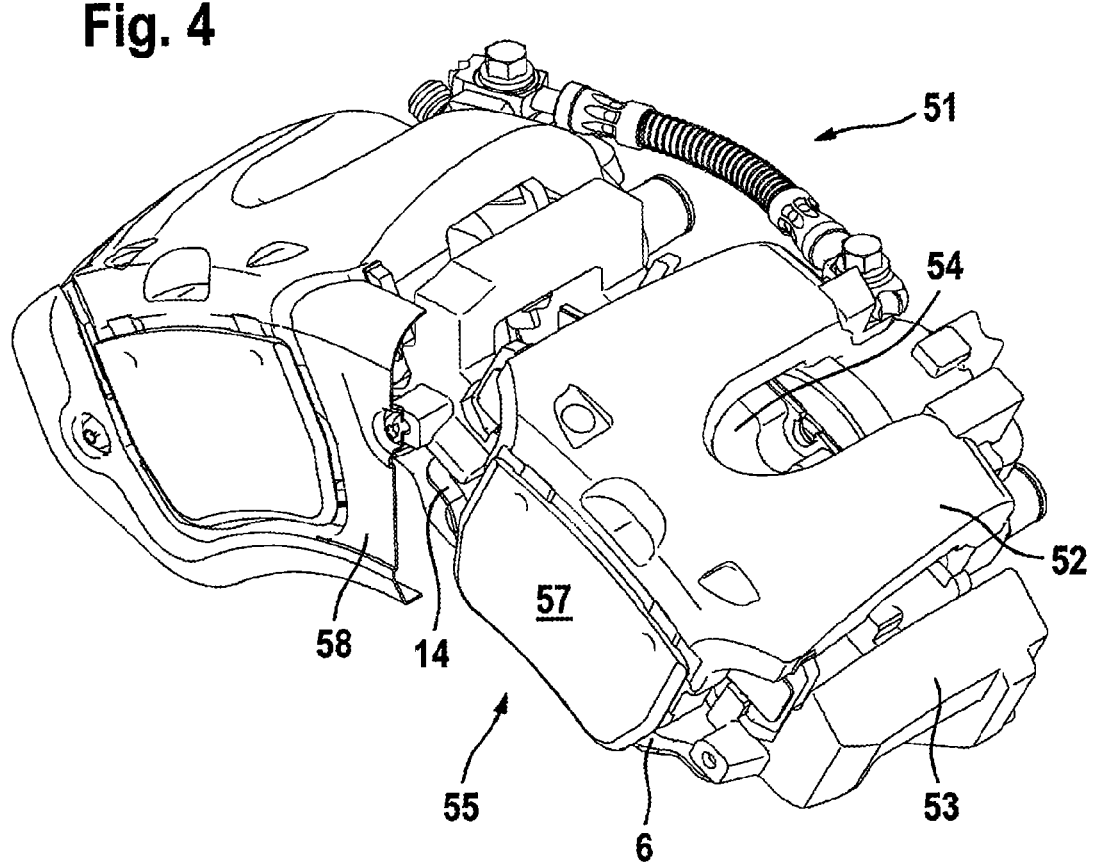
FIG. 4 shows a perspective view of a disk brake having two brake calipers with in each case one caliper panel for the brake calipers, and a common bracket panel.

FIGS. 1 to 4 show a first basic embodiment of a spring arrangement 5,45,55 with a caliper panel 7,47,57, with FIG. 1 illustrating an individual spring arrangement 5 and FIG. 2 to FIG. 4 illustrating the spring arrangement 5,45,55 in the installed state in different disk brakes 1,41,51. The spring arrangement 5 substantially comprises two fastening sections 10, a central section 11 and two spring arms 12. FIG. 2 shows that the spring arms 12 press with in each case a ball-shaped finger 13 against a bracket 3 which is fixed with respect to the vehicle, with in each case one link 14 producing the connection to the central section 11 and substantially generating a preload $F_v$. The central section 11 merges into the fastening sections 10, which comprise in each case one hook-in device 15 and one support 17. Since the central section 11 and the fastening sections 10 are perpendicular to the spring arms 12, the elastic deformation of the spring arms 12 is a multiple greater than that of the fastening sections 10 and of the central section 11. The fastening devices 15 extend through bores 9 in that caliper limb of the brake caliper 2 which is remote from the vehicle, and press the brake caliper 2 against the bracket 3 by means of radial contact surfaces 18. The force flow of the preload $F_v$, which runs here through the brake linings 4, serves to fix the brake linings 4 in a radial direction 8 in relation to a rotational axis of a brake disk (not illustrated). The special bending of the fastening devices 15 has the effect that the contact between the fastening device 15 and brake caliper 2 takes place not via an edge 19 with the thickness S of the spring arrangement 5, but rather via the larger, slightly ball-shaped contact surface 18. In order that the spring arrangement 5 acts in a captively retained fashion on the disk brake 1, the fastening devices 15 have in each case one hook 16 which, in the installed and preloaded state, bears against an inner side, which faces away from the brake disk, of the caliper limb, and thereby prevent the spring arrangement 5 from sliding out axially. Two recesses 20 are situated in the central section 11, which recesses 20, as shown in FIG. 1, serve to receive connecting means 21 of the caliper panel 7. Rivets or screws are conceivable as connecting means 21. The caliper panel, and also a protective panel for a disk brake generally, has the purpose of keeping dirt and other spurious influences away from the brake disk. The caliper panel may also serve to standardize the appearance of the disk brake and to harmonize the overall visual impression by covering individual components. In addition to this advantageous dual effect, the protective panel may also be designed graphically and in an application-specific manner, for example with a name or type designation. Here, the protective panel is designed so as to cover a significant part of the brake caliper, that is to say said protective panel forms a defined surface on that side of the disk brake which faces away from the vehicle. Here, said protective panel may either cover only the brake caliper or the entire disk brake. It is advantageous that the caliper panel can be easily exchanged, and the disk brake can thereby be visually upgraded in a simple manner.

FIG. 2 shows the positive effect of the recesses 20 in the central section 11. The preload force $F_v$ which acts between the bracket 3 and the brake caliper 2 flows from the fingers 13 via the links 14 through the central section 11 via the support 17 into the fastening devices 15. In order that said force flow is harmonized and uniform and to avoid stress peaks, the transition between the links 14, the central section 11 and the fastening devices 15 is rounded. Said geometric design has the effect that the stresses are concentrated uniformly in the edge region of the transition 22. The recesses 20 in the central section x also have the effect that the force flow is conducted away from the corners 23 of the recess 24.

The disk brake in FIG. 3 is, with regard to the spring arrangement 45, of the same basic design as in FIG. 2. In this embodiment, in addition to the caliper panel 47 for the brake caliper 42, a bracket panel 48 is provided which is adapted geometrically to the caliper panel 47. As a result of the interaction of the bracket panel 48 and caliper panel 47, the disk brake 41 has a complete protective covering on the side facing away from the vehicle. This may however also be achieved by virtue of a specially designed bracket panel by virtue of said bracket panel extending over the entire disk brake 41, and a separate protective panel for the brake caliper 42 therefore being superfluous. The bracket panel 48 and/or the protective panel 47 may be produced from a metallic material or from plastic, which has proven to be particularly corrosion-resistant here. This may also be realized by means of a suitable coating or paint layer on the protective panel and/or of the bracket panel.

The disk brake 51 illustrated in FIG. 4 comprises in each case two brake calipers 52 and two pairs of brake linings 54 in order to increase braking power. Said brake linings 54 are movably mounted on a common bracket 53 which is fixed with respect to the vehicle. Here, similarly to the disk brake 41 shown in FIG. 3, one caliper panel 57 and one common bracket panel 58 are installed per brake caliper 52. The bracket panel 58 extends over the entire bracket 53 and engages around the caliper panel 57, such that the entire surface, which faces away from the vehicle, of the disk brake 51 is protected and visually harmonized.

With regard to FIGS. 2 to 4, it should be noted that the geometric design with regard to the arrangement of the spring arrangements 5,45,55 in the respective disk brake 1,41,51, in particular with regard to the contact points of the spring arrangement 5,45,55 to the brake components, may also be designed differently. For example, a spring arrangement may be designed in such a way that the preload is realized not by tension but rather by compression.

Figure 5:
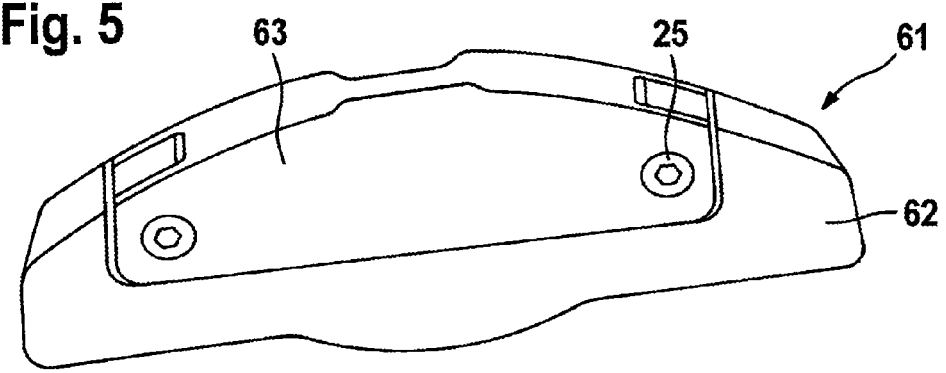
FIG. 5 shows a disk brake having a frame caliper and a further embodiment of a spring arrangement with a caliper panel.
Figure 6:
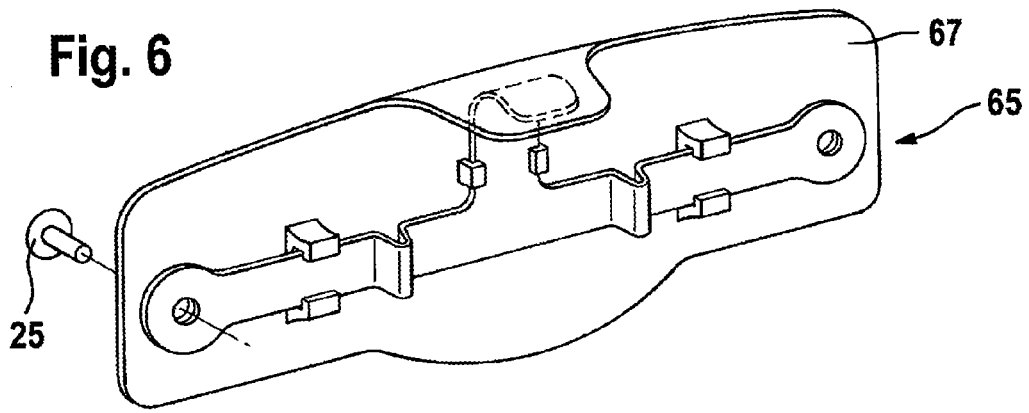
FIG. 6 shows the spring arrangement from FIG. 5.
Figure 7:
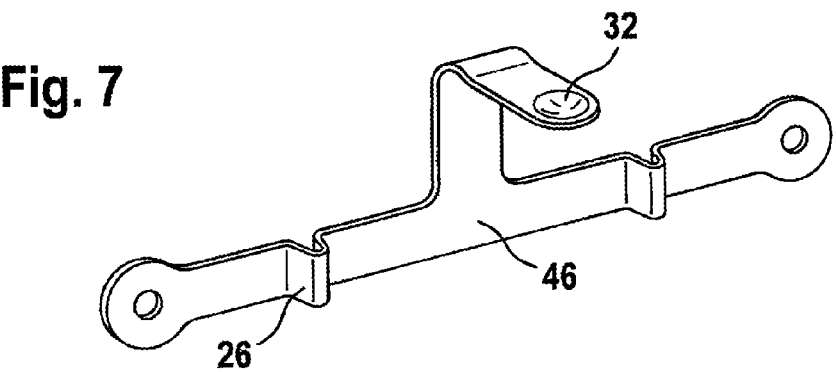
FIG. 7 shows the spring element of the spring arrangement from FIG. 6.
Figure 8:
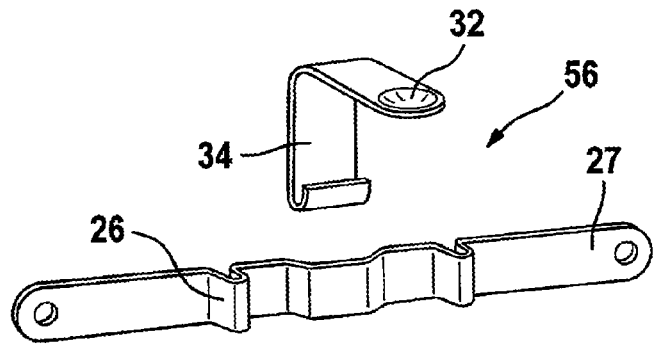
FIG. 8 shows a further embodiment of the spring element of the spring arrangement from FIG. 6, FIG. 9 a) shows a further embodiment of the spring arrangement from FIG. 5, with
   b) and c) showing in each case one refinement of the spring element, FIG. 10 a) and b) show a detail section through the brake caliper from FIG. 5, showing the interaction of the spring element and brake caliper, and FIG. 10 c) shows the fastening of the spring arrangement to the bracket in a detail section.
Figure 9A:
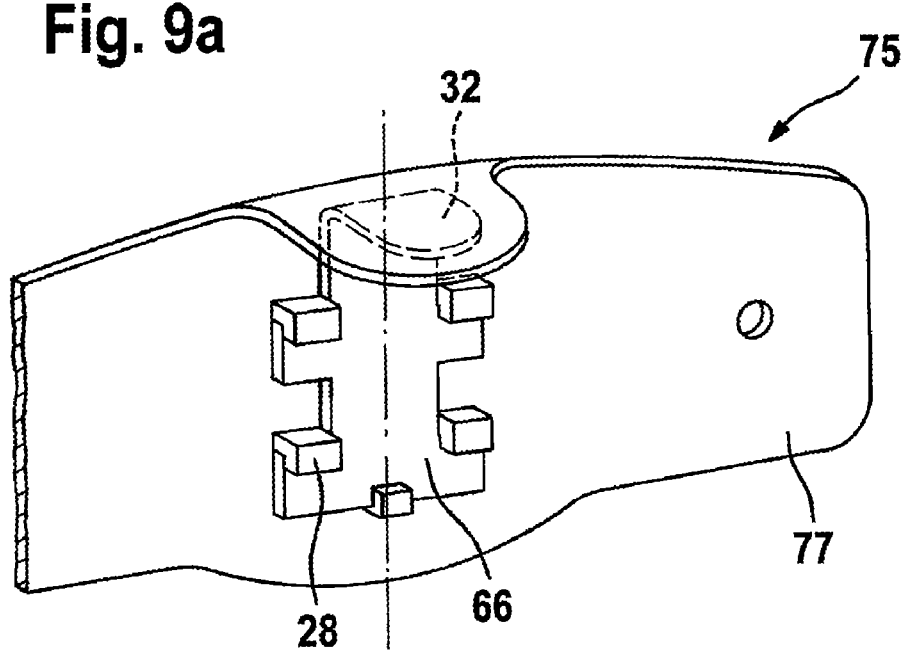
Figure 9B:
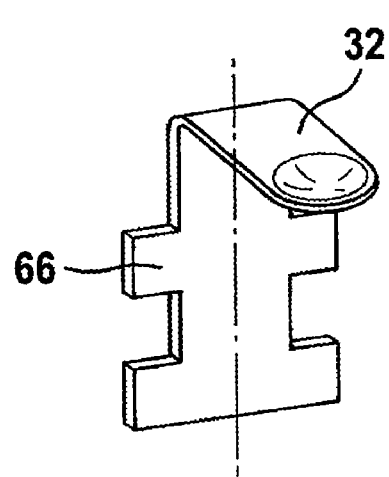
Figure 9C:
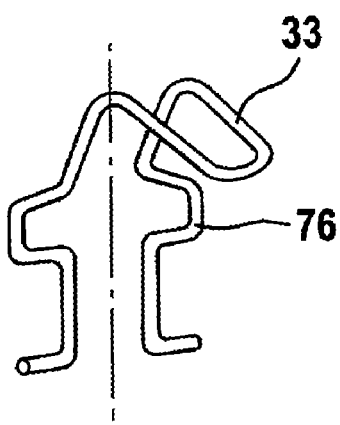

FIGS. 5 to 10 describe a further embodiment with different configuration variants of a spring arrangement 65,75 with a spring element 46,56,66,76 and a caliper panel 76,77. The basic design of the spring arrangements 65,75 is selected here such that the spring arrangements 65,75 are fixed to the bracket 63 and the spring element 46,56,66,76, with a spring arm 32,33, builds up a preload $F_v$ with respect to the brake caliper 62. FIG. 5 shows a spring arrangement 65,75 of said type in the installed state on a disk brake 61 with a brake caliper 62 which is designed as a frame caliper. FIG. 6 clearly shows the way in which the spring arrangement 65 is composed of the spring element 46 and the caliper panel 67, which are fastened to the frame caliper by common fastening means 25. Since the fastening points on the bracket 63 may be subjected to different elastic deformation during a braking process, compensating means 26 are provided on the spring element 46 (FIG. 7). Whether the common fixing of the caliper panel 67 and of the spring element 46 to the bracket 63, compensating means are also provided on the caliper panel 67, which compensating means compensate the different deformation of the bracket 63. In a further refinement, the spring element 56 of the spring arrangement 65 is formed in a plurality of parts from a spring piece 34, composed of spring steel, and of a support plate 27 (FIG. 8). The two components may be riveted to one another or connected in a form-fitting manner. As shown in FIGS. 9a to 9c, it is possible to dispense entirely with the support plate by virtue of the caliper panel 77 assuming the function of said support plate. Here, the remaining spring element 66,67 is attached to the caliper panel 77 by means of a fastening device 28, and may be produced either from sheet metal (FIG. 9b) or from spring wide (FIG. 9c).

Figure 10A:
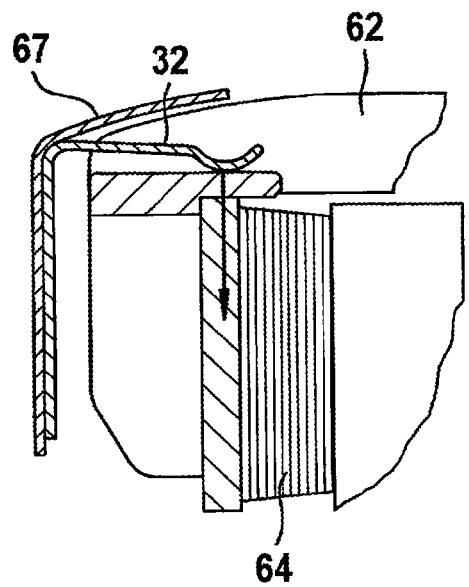
Figure 10B:
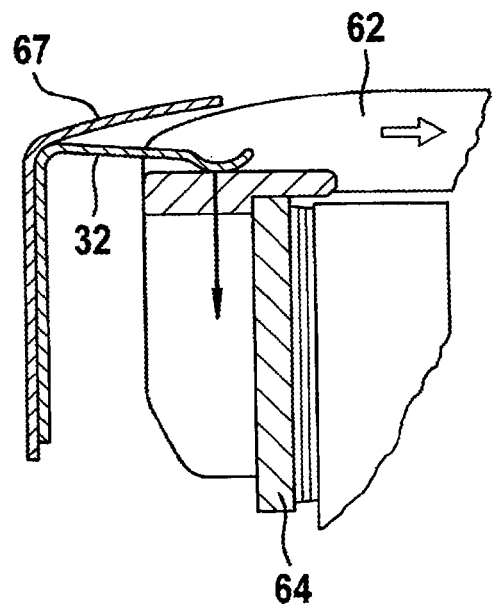
Figure 10C:
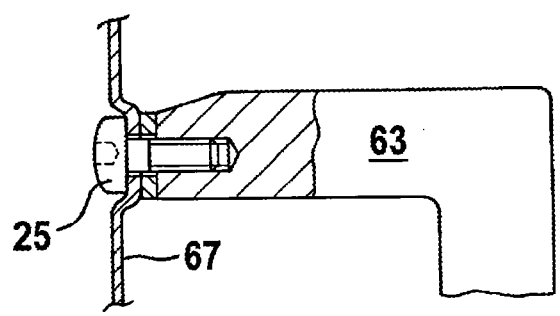

The variants of a spring arrangement shown in FIGS. 5 to 9 are fixedly connected to the bracket 63 (FIG. 10c) and generate a preload $F_v$ with respect to the brake caliper 62 by means of the spring arm 32 of the spring element 46,56,66,76. Since the spring arm 32 bears against the brake caliper 62, the contact point 30 of the spring arm 32 and brake caliper 62 moves depending on the wear state of the brake lining 64 (FIG. 10a,b).

Figure 11:
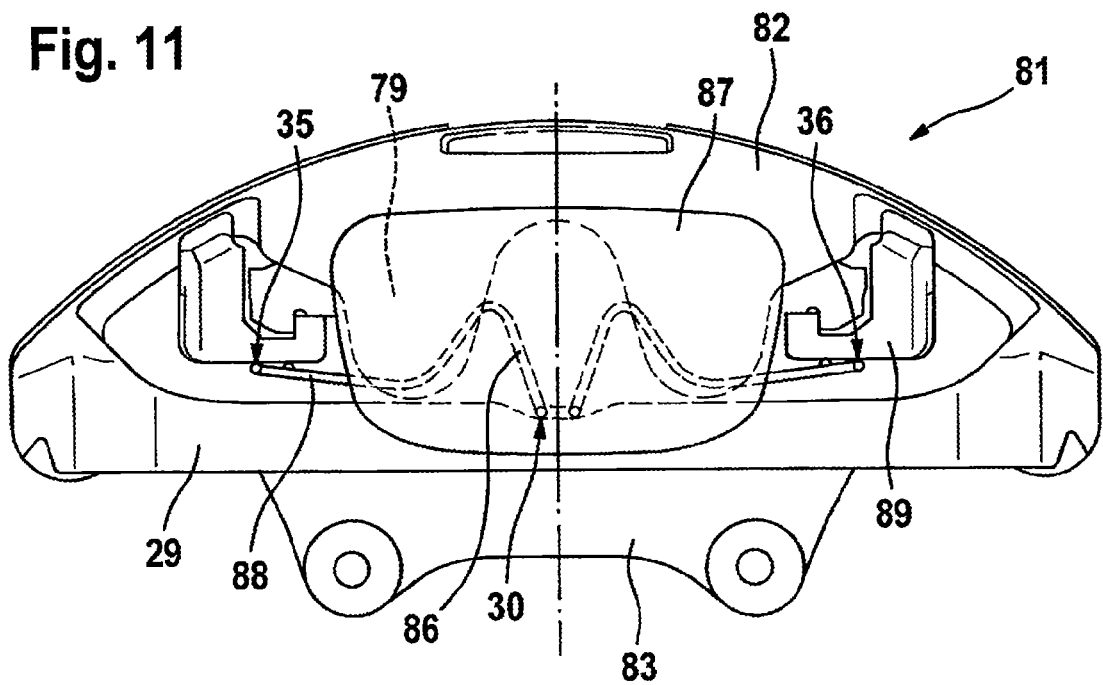
FIG. 11 shows a disk brake having a frame caliper and a spring arrangement in a further embodiment.
Figure 12:
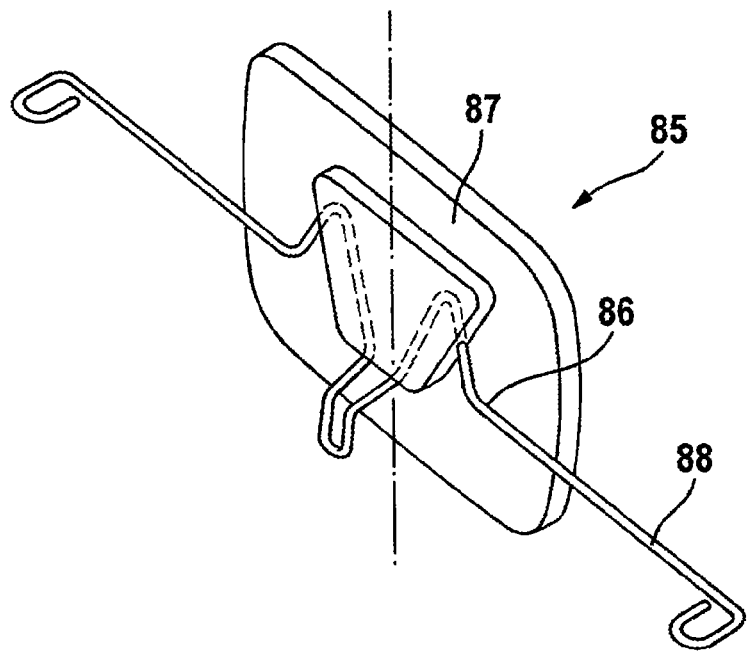
FIG. 12 shows a perspective view of the spring arrangement from FIG. 11.

An additional embodiment of a spring arrangement 85 is illustrated in FIGS. 11 and 12. Said spring arrangement 85 is composed of a wire spring element 86 and a caliper panel 87 composed of plastic. The present example describes a variant for a disk brake 81 having a brake caliper 82 which is embodied as a frame caliper. The preload $F_v$ is imparted substantially by the spring arms 88 between the bracket arms 89 of the bracket 83 and the frame 29 of the frame caliper. Here, the spring element 86 is bent in such a way that suitable contact points 30,35,36 are formed, and a section 31 of the spring arrangement 85 is surrounded by the material of the caliper panel 87. Said section 31 is stiffened by the plastic encapsulation.

The caliper panel 87 is preferably integrally cast on the spring element 86. Also conceivable are detachable connecting methods, such as for example a clip mechanism. Instead of the wire, the spring element 86 may, as in the previous exemplary embodiments, be shaped from a metal sheet.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A disk brake for a vehicle comprising:
   a protective panel;
   a bracket fixed with respect to the vehicle and on which brake linings and at least one brake caliper are mounted so as to be movable in an axial direction; and
   the at least one brake caliper having a spring arrangement comprising at least one fastening section, a spring arm having at least one finger, and a bridge section;
   wherein contact between the at least one finger of the spring arm and the bracket generates an elastic preload between the brake caliper and the bracket such that the preload is aligned substantially perpendicular to a movement direction of the brake caliper,
   wherein the at least one finger, the spring arm, and the protective panel are arranged axially with respect to one another such that the spring arm is positioned between the finger and the protective panel, and
   wherein the protective panel covers the fastening section and the bridge section of the spring arrangement.

2. The disk brake as claimed in claim 1, wherein the caliper panel covers most of the housing finger of the brake caliper.

3. The disk brake as claimed claim 1, wherein the spring arrangement is fixed to the brake caliper by a fastening device.

4. The disk brake as claimed in claim 1, wherein the spring arrangement is fixed to the bracket by fastening means.

5. The disk brake as claimed in claim 1, wherein the spring element is formed in multiple parts from a spring piece and a support element.

6. The disk brake as claimed in claim 1, wherein the spring element is attached to the caliper panel such that a force flow of a preload ($F_v$) runs, in sections, through the caliper panel.

7. The disk brake as claimed in claim 1 further comprising a bracket panel fixedly connected to the bracket.

8. The disk brake as claimed in claim 7, wherein the bracket panel interacts with the caliper panel, serves as a multi-part protective panel and covers a significant part of the disk brake.

9. A disk brake for a vehicle comprising:
   a brake caliper;
   a bracket fixed with respect to the vehicle;
   at least two brake linings being mounted in the disk brake so as to be movable in an axial direction, wherein the brake caliper engages around at least one brake disk which can be acted on axially by the brake linings;
   the brake caliper having a spring arrangement comprising at least one fastening section and a bridge section; and
   at least one protective panel provided on the disk brake such that the protective panel covers the fastening section and the bridge section of the spring arrangement.

10. The disk brake as claimed in claim 9, wherein the protective panel is embodied as a bracket panel and is fixed to the bracket by fastening means.

11. The disk brake as claimed in claim 9, wherein the protective panel is formed from plastic.

12. The disk brake as claimed in claim 9, wherein the protective panel serves as a caliper panel and is fixed to the brake caliper by a fastening device.

13. The disk brake as claimed in claim 12, wherein the caliper panel is formed from plastic and wherein a spring element of the spring arrangement is arranged at least partially in the material of the caliper panel.

14. The disk brake as claimed in claim 13, wherein the spring element and the caliper panel are connected by a form-fitting and detachable mechanism.

* * * * *